June 28, 1955     L. G. SIMJIAN     2,711,667

PROMPTING DEVICE

Filed Jan. 30, 1952

INVENTOR.

United States Patent Office 2,711,667
Patented June 28, 1955

2,711,667

PROMPTING DEVICE

Luther G. Simjian, Riverside, Conn., assignor to The Reflectone Corporation, a corporation of Connecticut Application January 30, 1952, Serial No. 268,975

2 Claims. (Cl. 88—16)

This invention relates to prompting devices and has particular reference to a prompting device for a person who is posing in front of a moving picture camera, a television pick-up camera or a similar apparatus of the audio-visual recording type whereby visual prompting information is made available to the person posing, but rendered invisible to the recording apparatus.

In the past, placards, greatly enlarged scripts or other means containing prompting information have been placed in view of the person posing, but outside of the range of the moving picture camera or television camera. Also recently it has become a common practice to project the text of the address to be delivered onto a screen located in the rear of the recording camera at or near the far end of the studio thereby enabling the speaker to read his lines by looking in the general direction of the pick-up camera.

These means for prompting have not proved satisfactory for obvious reasons. The speaker may look at the placards so intensely for help that the use of such prompting becomes very obvious due to the aversion of the speaker's eyes from aperture of the camera. The speaker's eye sight may be so defective as to make reading of distant lines impossible. Furthermore, if the speaker focuses his eyes on a screen located in a plane materially beyond the camera, the personal "touch" between the speaker and the viewing audience is lost because the viewing audience notices that the speaker's eyes are focused not on the camera aperture but on some remote object.

One object of this invention is to provide an improved prompting device which avoids one or more of the disadvantages and limitations of prior art arrangements.

Another object of the invention is to provide a prompting device which permits the person posing to focus his eyes on the plane of the picture taking apparatus.

A further object of this invention is to enable the person posing to read the prepared information not only in the line of sight between the camera and the speaker but also in a focal plane which is substantially coincident with the camera.

A still further object of the invention is to provide means for the person posing to see his own image with superposed prompting information while looking into the pick-up camera and having his eyes focused at the camera.

With these and other objects in view the invention comprises transparent reflecting screen means angularly placed between the camera and the person posing. Graphic information is positioned out of the range of view of the camera in such a way that it becomes visible to the person facing said camera by means of the transparent reflecting means.

If the person posing desires to see his own image in addition to the prompting information, an image reflecting screen is placed in his line of sight thereby causing the person to see his own image with a superposed image of the graphic information. By virtue of the transparent reflecting means the images are visible to the person posing but remain invisible to the camera and the audience.

For a better understanding of the present invention together with other and further objects thereof reference is made to the following description taken in connection with the accompanying drawings in which.

Figure 1:
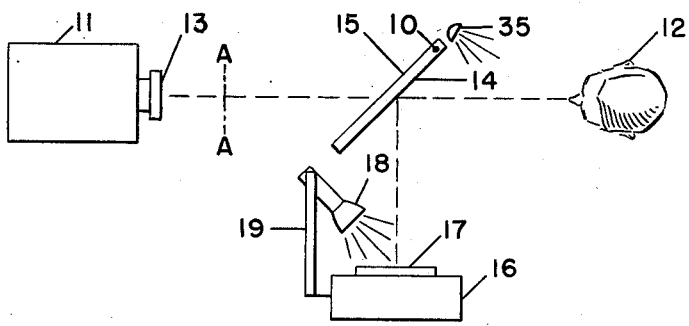
Figure 1 is a schematic top view of the prompting device including the representation of a person posing in front of a camera.

In Figure 1, a transparent reflecting means identified by numeral 10, disposed between a camera 11 and a person 12, is inclined with respect to the line of sight of person 12 facing the image forming lens or aperture 13 of camera 11. This transparent reflecting means 10 may comprise a transparent glass plate of the window pane type, the surface of which, as is well known, partially reflects incident light rays. It may be found advantageous, however, to improve the reflecting characteristics of the glass plate by applying a thin metallic film on the surface 14 which faces the person. This metallic deposit must be of such thinness that the transparency of the glass plate 10 is not materially affected thereby. Correspondingly, it may be found advantageous to apply a thin reflection inhibiting coating onto the surface 15 which is located opposite the aperture 13 of the pick-up camera 11. Reflection inhibiting coatings are well known in the art, such as a thin coating of fluoride to mention one.

Positioned out of the range of view of the camera aperture 13 but situated within the range of the transparent reflecting means 10 there is a stand 16 with suitable graphic information 17 retained thereon. A light source 18 suspended from stand 16 by means of bracket 19 illuminates the information 17.

Person 12, facing the camera 11 and being well illuminated by light source 35 will see at the plane A—A, a virtual image of the graphic information 17 by virtue of the partially reflecting surface 14 which is positioned in such a manner as to reflect an image of the graphic information 17. The prompting information 17 therefore is visible to the person 12 but not to the camera 11.

If this prompting information, for instance, is placed so that its virtual image coincides with the line of sight between the eyes of person 12 and the aperture 13, person 12 will be able to receive prompting information without averting his eyes from aperture 13 of camera 11.

Figure 2:
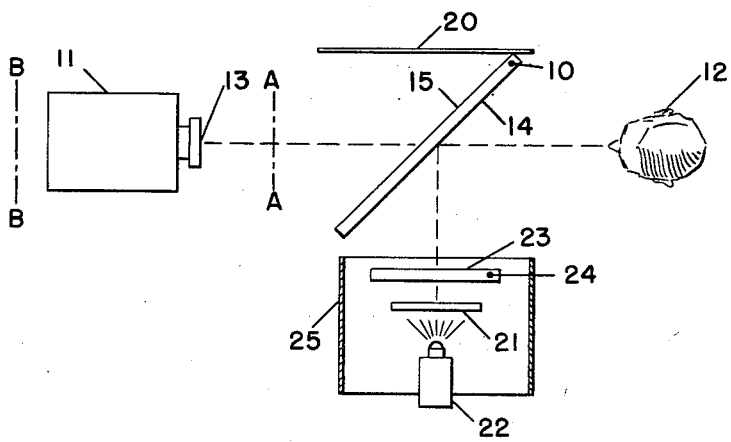
Figure 2 is a schematic top view of the prompting device with an added image reflecting screen in front of the graphic prompting information.

Figure 2 shows a modification of the arrangement shown in Figure 1. A light absorbing surface 20 covering the range of view of the camera 11 as partly reflected by surface 15 is so mounted in relation to the transparent reflecting screen 10 as to minimize undesirable ambient light reflected into the aperture 13 of camera 11. The prompting information 21 is in the form of a transparent sheet or plate having for instance, opaque background and transparent printing and is illuminated from the rear by means of a light source 22. The prompting information, as in Figure 1, is reflected by surface 14 of the transparent screen 10 thereby becoming visible to the person 12 facing the camera at the plane A—A. A light shield 25 surrounding the illuminated prompting information 21 serves to exclude excessive ambient light thereby enhancing the readability of the information.

By placing a transparent image reflecting screen 24 comprising a transparent plate equipped with one semi-reflecting surface 23 between the prompting information 21 and the transparent reflecting screen 10 and within the range of the partially reflecting surface 14 of the transparent screen 10, a virtual image of the person 12 facing the camera 11, reflected from image reflecting screen 24, becomes visible to person 12 at the plane B—B. The prompting information 21 remains visible to the person 12 by transmission through the transparent image reflecting screen 24 and by reflection from surface 14. In this manner, person 12 facing aperture 13 will view simultaneously a virtual image of the information 21 and an image of himself. Both images remain invisible however to the camera 11.

It is apparent to those skilled in the art that the same result is obtained by positioning the image reflecting screen 24 on the viewing line between the person 12 and the aperture 13 and substantially normal to this line. It is also apparent that similar results are achieved by the promoting device shown in Figure 1 with a like insertion of image reflecting screen 24.

Figure 3:
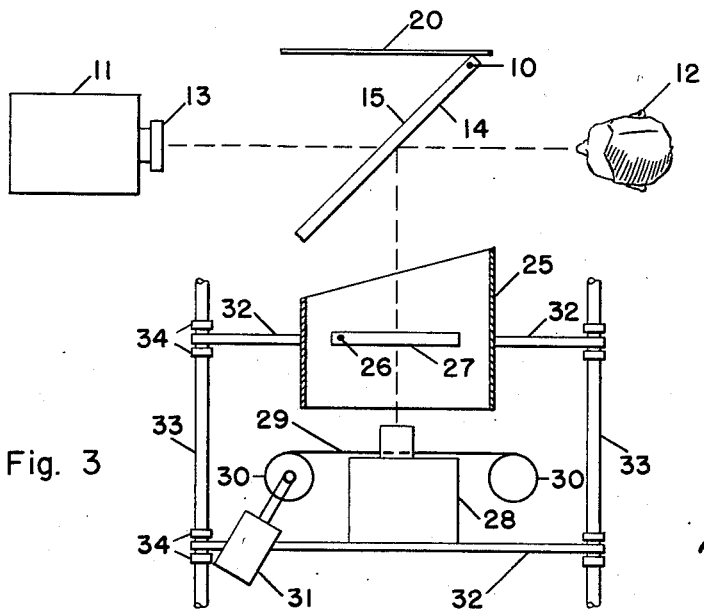
Figure 3 is a schematic top view of the prompting device with a projector and an image forming screen to project the graphic prompting information.

In Figure 3 a projector 28 projects prompting information contained on a transparent film 29 onto the translucent surface 27 of an image forming screen 26. In its simplest construction the image forming screen 26 comprises a transparent glass plate having a ground surface 27 thereby constituting an image forming translucent screen. The image of the information obtained on the image forming screen 26 is viewed by the person 12 on the reflecting surface 14 of the transparent reflecting screen 10. The flow of the information contained on transparent film 29 and projected through the projector 28 is controlled by means of a motor 31 attached to film reels 30. It is obvious that the motor may be under control of the person 12 posing before the camera 11 or also under the control of a different person, such as the program director, thereby obtaining precise timing and cueing for the person 12.

The projector with light shield 25 and image forming screen 26 is slidably mounted on slides 33 with locking rings 34 thereby rendering the virtual image focal plane of the information adjustable with respect to the camera aperture 13.

The image of the person 12 posing before the camera 11 may be made visible to person 12 by inserting the transparent image reflecting screen 24 of Figure 2 either along the viewing line between the person 12 and aperture 13 or along the viewing line between reflecting surface 14 and translucent image screen 26 substantially normal to the respective viewing line. Then, the image of the information and that of the person will be simultaneously visible to the person 12 in the line of sight joining person 12 and aperture 13. It is obvious to those skilled in the art that by varying the distance between the transparent reflecting screen 10 and the image forming screen 26 as well as between the image forming screen 26 and the inserted transparent image reflecting screen 24, the information image and the person's image may be made to appear in the same focal plane superposed with respect to one another, or both virtual images may be made to appear in differing focal planes as desired. In a similar manner, the surface of the inserted transparent image reflecting screen may be curved in such a manner as to affect the distance between the person and his virtual image. Still further, it will be apparent to those skilled in the art that the image forming translucent screen 26 may be combined with the semi-reflecting transparent screen 24 by substituting in place of the translucent screen 26 a single glass plate with the surface facing the projector 28 having translucent characteristics and the surface facing the transparent reflecting screen 10 having semi-reflecting transparent characteristics. In this manner the information image and the person's image are rendered visible to person 12 by means of a single image screen. When this image screen is inserted with its surfaces reversed, only the prompting information is rendered visible to person 12.

While there have been described and illustrated specific embodiments of the invention, it will be obvious that various changes and modifications may be made therein without departing from the field of the invention which should be limited only by the scope of the appended claims.

What is claimed is:

1. A prompting device for use by a person facing an image forming lens comprising, a first transparent reflecting screen disposed between the lens and the person and inclined with respect to the line of sight between said lens and said person, said transparent screen having a partially reflecting surface exposed toward the person and a reflection reducing surface toward the lens, graphic information positioned out of the range of the lens but within range of the first reflecting screen, a light absorbing surface out of range of the lens but covering the range of view of the lens as reflected from the first reflecting screen and a second transparent reflecting screen interposed in the line of sight of said person and having a semi-reflecting surface which reflects an image of the person so as to be visible by the person, the combination of the first and second reflecting screens creating simultaneous virtual images of the person and the graphic information visible along the line of sight between the person and the image forming lens.

2. A prompting device for use by a person facing an image forming lens comprising, a first transparent reflecting screen disposed between the lens and the person and inclined with respect to the line of sight between said lens and said person, said transparent screen having a partially reflecting surface exposed toward the person and a reflection reducing surface toward the lens, graphic information positioned out of range of the lens but within range of the first reflecting screen, a light absorbing surface covering the range of view of the lens as reflected from the reflecting screen, and a second transparent reflecting screen placed adjacent said graphic information, said second screen having a semi-reflecting surface which reflects an image of the person, the combination of the first and second reflecting screens creating simultaneous virtual images of the person and the graphic information visible along the line of sight between the person and the image forming lens.

References Cited in the file of this patent

UNITED STATES PATENTS

| | | |
|---|---|---|
| 1,418,033 | Sutcliffe | May 30, 1922 |
| 1,709,598 | Simjian | Apr. 16, 1929 |
| 1,959,038 | Ridgeway | May 15, 1934 |
| 2,051,608 | Kean | Aug. 18, 1936 |
| 2,311,914 | Tiffin et al. | Feb. 23, 1943 |
| 2,420,198 | Rosenthal | May 6, 1947 |
| 2,484,379 | Goldberg | Oct. 11, 1949 |

FOREIGN PATENTS

| | | |
|---|---|---|
| 3,763 | Great Britain | of 1909 |